(12) United States Patent
Tsuruta et al.

(10) Patent No.: US 11,588,184 B2
(45) Date of Patent: Feb. 21, 2023

(54) CELL WITH A TAB LESS ELECTRODE

(71) Applicant: Tesla, Inc., Palo Alto, CA (US)

(72) Inventors: Kunio Tsuruta, Mountain View, CA (US); Mikel Ehrlich Dermer, Santa Clara, CA (US); Rajeev Dhiman, Pleasanton, CA (US)

(73) Assignee: Tesla, Inc., Austin, TX (US)

( * ) Notice: Subject to any disclaimer, the term of this patent is extended or adjusted under 35 U.S.C. 154(b) by 0 days.

(21) Appl. No.: 16/673,464

(22) Filed: Nov. 4, 2019

(65) Prior Publication Data

US 2020/0144676 A1    May 7, 2020

Related U.S. Application Data

(60) Provisional application No. 62/755,685, filed on Nov. 5, 2018.

(51) Int. Cl.
| | |
|---|---|
| *H01M 10/0587* | (2010.01) |
| *H01M 4/04* | (2006.01) |
| *H01M 4/62* | (2006.01) |
| *H01M 50/538* | (2021.01) |

(52) U.S. Cl.
CPC ..... *H01M 10/0587* (2013.01); *H01M 4/0404* (2013.01); *H01M 4/624* (2013.01); *H01M 50/538* (2021.01)

(58) Field of Classification Search
CPC ............. H01M 10/0587; H01M 2/263; H01M 4/0404; H01M 4/624
See application file for complete search history.

(56) References Cited

U.S. PATENT DOCUMENTS

| | | | |
|---|---|---|---|
| 2005/0008933 A1 | 1/2005 | Ligeois et al. | |
| 2005/0277019 A1 | 12/2005 | Riley | |
| 2009/0029240 A1 | 1/2009 | Gardner | |
| 2013/0048340 A1 | 2/2013 | Bando | |
| 2014/0113185 A1* | 4/2014 | Mori | H01M 50/531 |
| | | | 429/179 |

FOREIGN PATENT DOCUMENTS

| | | |
|---|---|---|
| CN | 102219265 A | 10/2011 |
| CN | 104409723 B | 9/2016 |

OTHER PUBLICATIONS

International Search Report and Written Opinion dated Jan. 24, 2020 in Application No. PCT/US2019/059691.

(Continued)

*Primary Examiner* — Jimmy Vo
(74) *Attorney, Agent, or Firm* — Knobbe Martens Olson & Bear LLP

(57) ABSTRACT

A cell of an energy storage device with at least one electrode that is tabless, and methods of forming thereof, are described. The cell includes a first substrate having a first coating disposed thereon, wherein a second portion of the first substrate at a proximal end along the width of the first substrate comprises a conductive material. An inner separator is disposed over the first substrate. A second substrate is disposed over the inner separator. The second substrate has a second coating disposed thereon. The first substrate, the inner separator, and the second substrate in a successive manner, the first substrate, the inner separator, and the second substrate are rolled about a central axis.

31 Claims, 13 Drawing Sheets

(56) References Cited

OTHER PUBLICATIONS

Chen et al., 2005, Electrochemical performance of layered Li[NixCO1-2xMnx]O2 cathode materials synthesized by a sol-gel method, Journal of Power Sources, 146:626-629.

Lu et al., 2013, High capacity Li[Ni0.8Co0.1Nm0.1]O2 synthesized by sol-gel and co-precipitation methods as cathode materials for lithium-ion batteries, Solid State Ionics, 249-250:105-111.

* cited by examiner

CELL WITH A TAB LESS ELECTRODE

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57. This application claims priority to U.S. Provisional App. No. 62/755,685 filed on Nov. 5, 2018, which is hereby incorporated by reference in its entirety.

BACKGROUND

Field

The present disclosure relates to a cell for an energy storage device.

Description of the Related Art

Many types of battery cells are currently used as energy sources in electric vehicles and energy-storage applications. Current cells use a jelly-roll design in which the cathode, anode, and separators are rolled together and have a cathode tab and an anode tab to connect to the positive and negative terminals of the cell can. The path of the current necessarily travels through these tabs to connectors on the outside of the battery cell. However, ohmic resistance is increased with distance when current must travel all the way along the cathode or anode to the tab and out of the cell. Furthermore, because the tabs are additional components, they increase costs and present manufacturing challenges.

SUMMARY

For purposes of summarizing the invention and the advantages achieved over the prior art, certain objects and advantages of the invention are described herein. Not all such objects or advantages may be achieved in any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

In one aspect, a cell of an energy storage device is described. The cell comprises a first substrate comprising a first coating, wherein a second portion of the first substrate at a proximal end along the width of the first substrate comprises a conductive material, a second substrate comprising a second coating, and an inner separator disposed between the first substrate and the second substrate, wherein the first substrate, the inner separator, and the second substrate are rolled about a central axis to form a cell.

In some embodiments, the conductive material consists essentially of the first substrate. In some embodiments, the first substrate is a current collector. In some embodiments, the first substrate is positioned closest to the central axis when rolled. In some embodiments, the second substrate is positioned closest to the central axis when rolled.

In some embodiments, a first portion of the first substrate located partway along a width of the first substrate is coated with an electrically insulative material. In some embodiments, the second portion is located adjacent to the first portion. In some embodiments, the second substrate further comprises a conductive tab. In some embodiments, the conductive tab is disposed partway along a length of the second substrate and extends transverse to a mid-plane of the second substrate. In some embodiments, the first substrate forms one of an anode and a cathode and the second substrate forms another of the anode and the cathode.

In another aspect, an energy storage device is described. The energy storage device comprises the cell of an energy storage device, and a can comprising a first end and a second end, wherein the first end comprises a first cap comprising a contact surface.

In some embodiments, the conductive material is in electrical contact with the contact surface. In some embodiments, the first end comprises a bottom wall. In some embodiments, each of the first and second ends are open ends. In some embodiments, the first end of the can is configured to receive the first cap. In some embodiments, the second end of the can is configured to receive a second cap. In some embodiments, the first cap comprises at least one of nickel (Ni) and a Ni-based alloy. In some embodiments, the contact surface of the first cap comprises a helically shaped groove.

In another aspect, a method for forming a cell is described. The method comprises providing a first substrate comprising a first coating wherein a second portion of the first substrate at a proximal end along the width of the first substrate comprises a conductive material, disposing an inner separator over the first substrate, providing a second substrate comprising a second coating, disposing the second substrate over the inner separator, and rolling the first substrate, the inner separator, and the second substrate disposed over each other about a central axis to form a cell.

In some embodiments, the first substrate is closest in position to the central axis. In some embodiments, the second substrate is closest in position to the central axis. In some embodiments, the first substrate, the inner separator, and the second substrate are disposed over each other in a successive manner.

In some embodiments, the method further comprises coating a first portion of the first substrate located partway along a width of the first substrate with an electrically insulative material. In some embodiments, the second portion is located adjacent to the first portion. In some embodiments, the method further comprises forming a conductive tab partway along a length of the second substrate by extending a portion of the second substrate transverse to a mid-plane of the second substrate.

In another aspect a method of forming an energy storage device is described. The method comprises the method for forming a cell, and placing the cell into a can comprising a first end and a second end, wherein the first end comprises a first cap comprising a contact surface.

In some embodiments, the method further comprises electrically connecting the conductive material with the contact surface.

All of these embodiments are intended to be within the scope of the invention herein disclosed. These and other embodiments of the present invention will become readily apparent to those skilled in the art from the following detailed description of the preferred embodiments having reference to the attached figures, the invention not being limited to any particular preferred embodiment(s) disclosed.

Figure 1:
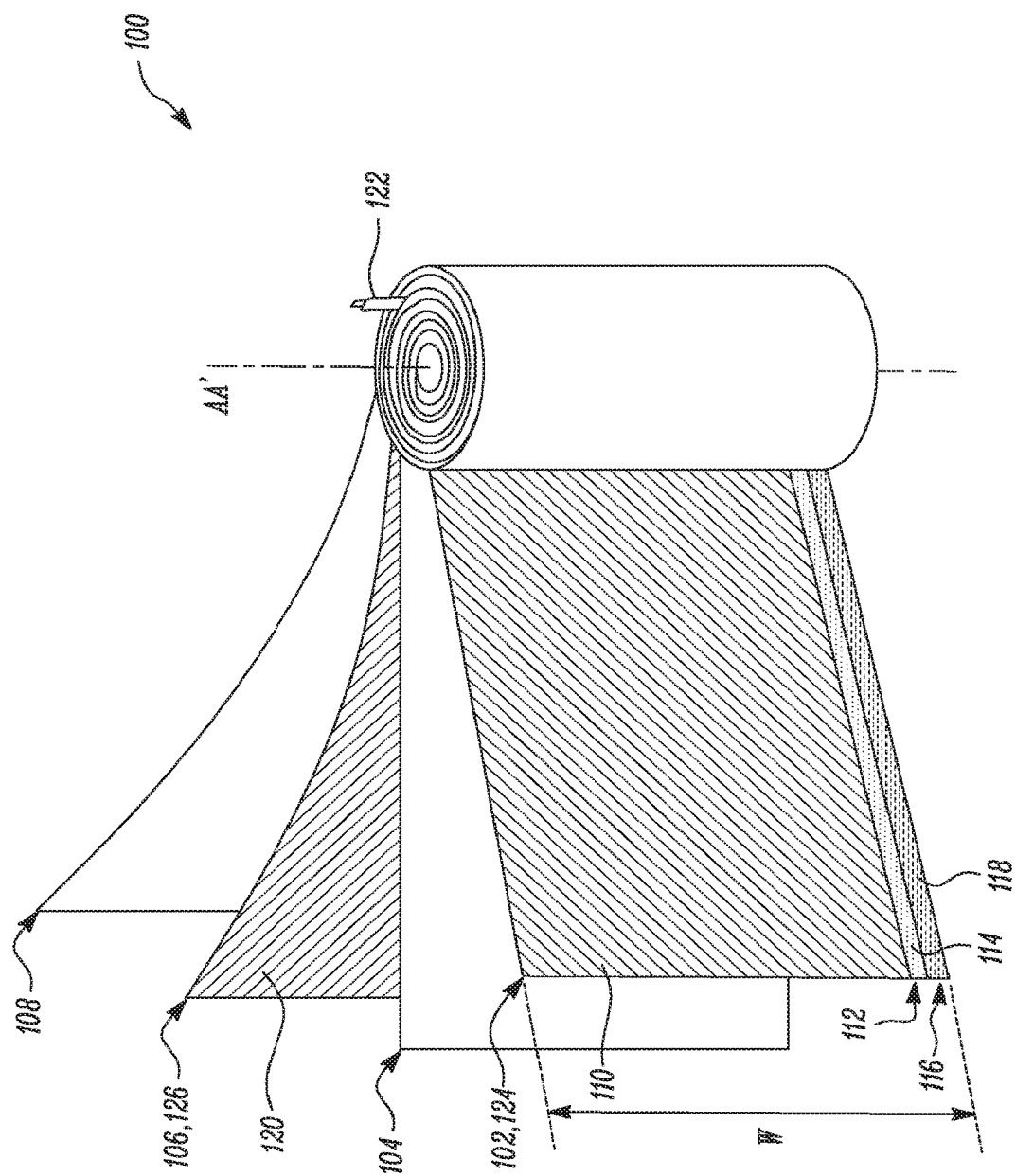
FIG. 1 illustrates a perspective view of a cell showing a first substrate, an inner separator, a second substrate, and an outer separator according to certain embodiments of the present disclosure.

Embodiments of the present disclosure and their corresponding advantages are best understood by referring to the detailed description that follows. It should be appreciated that like reference numerals are used to identify like elements illustrated in one or more of the figures, wherein drawings shown therein are for purposes of illustrating embodiments of the present disclosure and not for purposes of limiting the same.

DETAILED DESCRIPTION

The present disclosure relates to a cell for energy storage devices. More particularly, the present disclosure relates to a cell with at least one electrode that is tabless, and therefore may be used to form an energy storage device with reduced ohmic resistance and reduced cost. For example, within a jellyroll cell design, the negative electrode may include a conductive portion at one end that runs the length of the electrode, and connects to the bottom of a can to electrically connect the electrode to the can. In some embodiments, the can includes a cap with a particular design configured to increase the connection of the electrode to the cap. The cap may include ridges, bumps, cavities, or other features that provide for additional connectivity between the cap and the electrode.

Reference will now be made in detail to specific aspects or features, examples of which are illustrated in the accompanying drawings. Wherever possible, corresponding or similar reference numbers will be used throughout the drawings to refer to the same or corresponding parts.

FIG. 1 illustrates a cell 100 in accordance with certain embodiments of the present disclosure. In some embodiments, the cell 100 is embodied in the form of a secondary cell that is rechargeable upon discharge and thus, usable multiple times. In other embodiments, aspects of the present disclosure can be similarly applied to produce primary cells to minimize costs of such primary cells. Primary cells include cells that are typically non-rechargeable and hence, unfit for reuse upon being discharged.

As shown in FIG. 1, the cell 100 includes a first substrate 102 having a first coating 110 disposed on a side of the first substrate 102. In some embodiments, the first coating 110 may be disposed on both side of the first substrate 102. In some embodiments, the first substrate 102 is embodied, preferably, in the form of a laminate that has a pre-determined amount of thickness, for example, in the range of 0.01-1 millimeter (mm). In some embodiments, the first substrate 102 comprises a current collector. In some embodiments, the current collector comprises a metallic foil. In some embodiments, the current collector comprises aluminum and/or copper.

In some embodiments, the first coating 110 may be an electrically conductive coating having a first amount of electrical conductivity. In some embodiments, the first coating 110 may be an electrode film. In some embodiments, the electrically conductive coating comprises a electrode active material. In some embodiments, the electrode active material is a cathode active material. In some embodiments, the electrode active material is a anode active material. In some embodiments, the electrode active material is selected from a silicon material (e.g. metallic silicon and silicon dioxide), graphitic materials, graphite, graphene-containing materials, hard carbon, soft carbon, carbon nanotubes, porous carbon, conductive carbon, lithium nickel manganese cobalt oxide (NMC), a lithium manganese oxide (LMO), a lithium iron phosphate (LFP), a lithium cobalt oxide (LCO), a lithium titanate (LTO), a lithium nickel cobalt aluminum oxide (NCA), a layered transition metal oxide (such as $LiCoO_2$ (LCO), $Li(NiMnCo)O_2$ (NMC) and/or $LiNi_{0.8}Co_{0.15}Al_{0.05}O_2$ (NCA)), a spinel manganese oxide (such as $LiMn_2O_4$ (LMO) and/or $LiMn_{1.5}Ni_{0.5}O_4$ (LMNO)), an olivine (such as $LiFePO_4$), chalcogenides ($LiTiS_2$), tavorite ($LiFeSO_4F$), silicon, silicon oxide (SiOx), aluminum, tin, tin oxide (SnOx), manganese oxide (MnOx), molybdenum oxide ($MoO_2$), molybdenum disulfide ($MoS_2$), nickel oxide (NiOx), copper oxide (CuOx), and lithium sulfide ($Li_2S$), or combinations thereof. In some embodiments, the first coating further comprises a binder. In some embodiments, the first coating 110 may be disposed on the first substrate 102 by any means known to persons skilled in the art. Some examples of disposing the first coating 110 onto the first substrate 102 include, but are not limited to, mechanical deposition, electromechanical deposition, electrochemical deposition, or any combination of processes known to persons skilled in the art.

Additionally, or optionally, a first portion 112 of the first substrate 102, located partway along a width W of the first substrate 102, is coated with an electrically insulative material 114. In some embodiments, the electrically insulative material may be a polymeric insulative material. In some embodiments, the electrically insulative material may be a ceramic insulative material. In some embodiments, the ceramic insulative material comprises a ceramic powder. In some embodiments, the electrically insulative material may be selected from polyethylene, polypropylene, aluminum oxide (e.g. $Al_2O_3$), or combinations thereof. In some embodiments the electrically insulative material further comprises a binder. In some embodiments, the electrically insulative material 114 may be disposed on both side of the first substrate 102. In some embodiments, insulating layer 114 is omitted. In certain embodiments, the first portion 112 of the first substrate 102 may be omitted. In such embodiments, a formation step that is needed to form the first portion 112 of the first substrate 102 may be eliminated thereby rendering the first substrate 102 with a second portion 116 alone, as will be described hereinafter. In some embodiments, the electrically insulative material may aid to reduce or prevent electrical contact between the first substrate 102, the first coating 110 and/or the conductive portion 118 with the second substrate 106 and/or the second coating.

The second portion 116 of the first substrate 102, disposed at an extreme or end position along the width W of the first substrate 102 (e.g. the proximal end of the first substrate 102) and located adjacent to the first portion 112, comprises a conductive portion (i.e. conductive material) 118. In some embodiments, the conductive portion 118 is an exposed region of the first substrate 102 (e.g. current collector). In some embodiments, the conductive portion 118 consists or consists essentially of the first substrate 102. In some embodiments, the conductive portion 118 is absent of the first coating 110 and the insulative material 114. In some embodiments, the conductive portion 118 may be disposed on both side of the first substrate 102.

Figure 2:
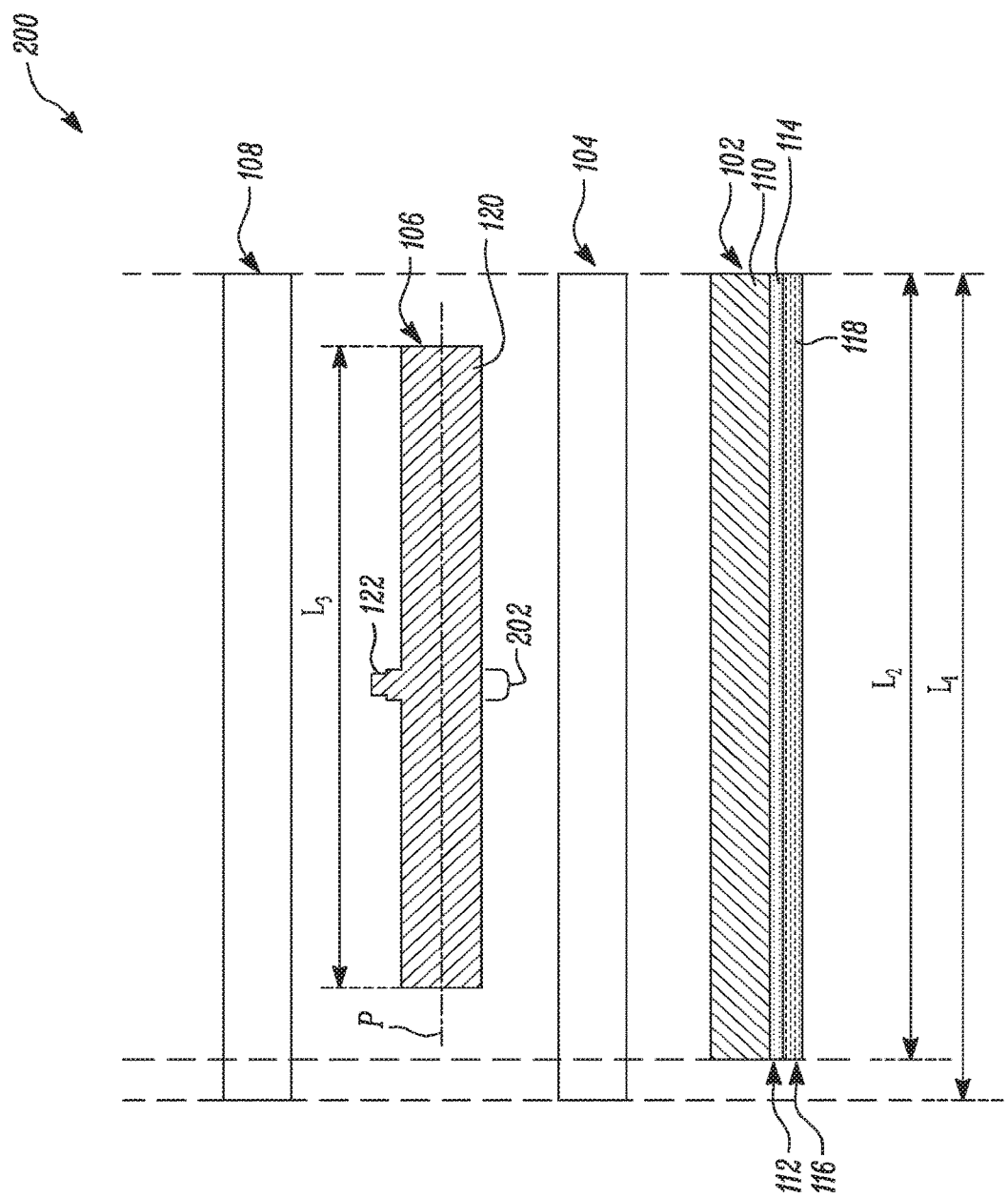
FIG. 2 illustrates a layout of the cell of FIG. 1 according to certain embodiments of the present disclosure.

Further, referring to FIG. 1 and also as shown in FIG. 2, an inner separator 104 is disposed over (e.g. stacked on top of) the first substrate 102. In some embodiments, the inner separator 104 is in the form of a laminate that has a pre-determined amount of thickness, for example, in the range of 0.01-0.05 millimeters (mm). In some embodiments to inner separator is or is about 10 μm, 15 μm, 20 μm, 30 μm, 40 μm or 50 μm, or any range of values therebetween (e.g. 10-15 μm). Furthermore, in some embodiments the inner separator 104 is electrically insulative. In some embodiments, the inner separator may comprise a polymeric material. In some embodiments, the inner separator may be selected from polyethylene, polypropylene, or combinations thereof. In some embodiments, the inner separator comprises multiple separator layers. In some embodiments, the inner separator comprises micro-pores.

Further, with continued reference to FIG. 1 and also as shown in FIG. 2, a second substrate 106 is disposed over (e.g. stacked on top of) the inner separator 104. The second substrate 106 has a second coating 120 disposed on a side of the second substrate 106. In some embodiments, the second coating 120 may be disposed on both side of the second substrate 106. In some embodiments, the second substrate 106 is in the form of a laminate that has a pre-determined amount of thickness, for example, in the range of 0.01-1 millimeter (mm). In some embodiments, the second substrate 106 comprises a current collector (e.g. a foil).

The second coating 120 is an electrically conductive coating having a second amount of electrical conductivity. In some embodiments, the second coating 120 may be an electrode film. In some embodiments, the electrically conductive coating comprises a electrode active material. In some embodiments, the electrode active material is a cathode active material. In some embodiments, the electrode active material is a anode active material. In certain embodiments, the second coating 120 may be similar to or the same as the first coating 110 and therefore may have similar or the same electrical conductivity. In certain other embodiments, the second coating 120 may be different than the first coating 110 and therefore may have different electrical conductivities. In some embodiments, the second coating 120 may be disposed on the second substrate 106 by any means known to persons skilled in the art. Some examples of disposing the second coating 120 onto the second substrate 106 include, but are not limited to, mechanical deposition, electromechanical deposition, electrochemical deposition, or any combination of processes known to persons skilled in the art.

With continued reference to FIG. 1 and also shown in FIG. 2, an outer separator 108 is disposed over (e.g. stacked on top of) the second substrate 106. In some embodiments, the outer separator 108 is in the form of a laminate that has a pre-determined amount of thickness, for example, in the range of 0.01-0.05 millimeters (mm). Furthermore, the outer separator 108 is electrically insulative. Upon stacking the first substrate 102, the inner separator 104, the second substrate 106, and the outer separator 108 in a successive manner, the first substrate 102, the inner separator 104, the second substrate 106, and the outer separator 108 are rolled about a central axis AA' with the first substrate 102 being closest in position to the central axis AA', as shown best in the view of FIG. 1. In some embodiments, outer separator 108 is absent.

Referring to FIG. 2, a layout 200 of the first substrate 102, the inner separator 104, the second substrate 106, and the outer separator 108 for forming the cell 100 of FIG. 1 is depicted. In some embodiments, outer separator 108 is absent. In certain embodiments, the inner and outer separators 104, 108 may be equal in length. In this embodiment, each of the inner and outer separators 104, 108 have a length $L_1$ as shown in FIG. 2. In some embodiments, the first substrate 102 may be of length $L_2$ while the second substrate 106 may be of length $L_3$. In certain embodiments, the length $L_2$ of the first substrate 102 may be equal to the length $L_3$ of the second substrate 106 (i.e. $L_2=L_3$).

In certain embodiments, the length $L_2$ of the first substrate 102 may be dissimilar, that is unequal, to the length $L_3$ of the second substrate 106 (i.e. $L_2 \neq L_3$). Furthermore, in some embodiments where the length $L_2$ of the first substrate 102 is not equal to the length $L_3$ of the second substrate 106 (i.e., $L_2 \neq L_3$), the inner separator 104 may be smaller in length than that of the outer separator 108. In some embodiments, the inner separator 104 is shorter in length than at least one of the first and second substrates 102, 106 while still providing electrical insulation between the first and second substrates 102, 106.

With continued reference to FIG. 2, in certain embodiments, a portion 202 of the second substrate 106 that is disposed partway along the length $L_3$ of the second substrate 106, may extend transverse to a mid-plane P of the second substrate 106 to form a conductive tab 122. Although one conductive tab 122 is shown associated with the second substrate 106 in the views of FIGS. 1 and 2, in some embodiments additional conductive tabs 122 may be present on the second substrate 106. In other embodiments, multiple portions of the second substrate 106, discrete from one another, may extend transversely in relation to the mid-plane P of the second substrate 106 to form multiple conductive tabs 122. It is hereby envisioned that when such multiple conductive tabs 122 are present on the second substrate 106, the ohmic resistance of the cell 100 is decreased compared to when a single conductive tab 122 is present on the second substrate 106.

The present disclosure offers numerous advantages compared to other advanced electrochemical cells, which utilize a tab contact to electrically connect the negative electrode substrate to the can wall in addition to the tab to connect the positive electrode to the cathode connection. Removing the tab connected to the negative electrode and reorienting the conductive connection to a conductive portion 118 allows the negative electrode to run along the length of the negative electrode. This reduces ohmic resistance through the negative electrode to the can, reduces current deviation across the length of the electrode, improves cell lifetime, reduces joule heating, and increases heat dissipation capability.

Equation 1 below describes the relationship between the electrical resistance R (Ω) of a given material and its intrinsic electrical resistivity $\rho$ (Ω·m) where l (m) and A (m$^2$) are the respective length and cross-sectional area of the material:

$$R = \rho \frac{l}{A}.\qquad \text{eq. 1}$$

The electrical resistance of a given material is directly proportional to its length. In conventional electrochemical cell designs, the electrode tab contact is typically fixed at either the end or the middle of the wound electrode. In order to initiate an electrochemical reaction, current must thus travel length-wise down the electrode current collector to reach the active material where the charge-transfer reactions take place. The distance the current will travel will vary from one half the length of the wound electrode if the tab is affixed at the electrode's midpoint, to the entire length of the electrode if the tab is affixed at either end. Embodiments within the present disclosure may provide a more uniform electrical contact between the electrode current collector and the interior can surface. The maximum distance current will travel is therefore the height of the electrode as opposed to its length. Depending on the cell form factor, the height of an electrode is typically 5% to 20% of its length. Therefore, the ohmic resistance in the negative electrode during electrochemical cycling can be reduced by 5 to 20 times via embodiments of the present disclosure.

An electrochemical cell of the presently disclosed embodiment may also experience significantly less current deviation, the phenomena where some electrode regions pass more or less current than other regions over its cycle lifetime. Current will preferentially travel along paths where resistance is lowest, which in the absence of other factors will typically be along paths closer to the tab where the ohmic resistance is smallest. Current deviation is extremely undesirable in electrochemical cells because it can lead to local electrode hotspots where large overpotentials are generated, leading to unwanted chemical reactions that reduce the cell's lifetime. An example of such a reaction is the plating of metallic lithium on the surface of the negative electrode in lithium-ion cells. The reduced ohmic resistance of the disclosed embodiment provides a cell environment more conducive to uniform current distribution and cell lifetime.

The presently disclosed embodiment also offers superior heat generation and transfer properties compared to conventional electrochemical cell designs. Ohmic heating (W), the process by which the passage of current through a medium generates heat is given by equation 2 below:

$$P \approx I^2 R \qquad \text{eq. 2}$$

Due to the reduced electrical resistance R described previously, we can expect electrochemical cells of the present disclosure to generate significantly less ohmic heat compared to cells of conventional tab designs.

Equation 3 below describes the relationship between heat conduction and the intrinsic and extrinsic variables of a conductor:

$$\dot{Q} = \frac{kA(T_2 - T_1)}{d} \qquad \text{eq. 3}$$

Where $\dot{Q}$ (J·s$^{-1}$) is the rate of heat transfer, k (W·m$^{-1}$·K$^{-1}$) is the material's thermal conductivity, A (m$^2$) and d (m) are the geometric dimensions over which the heat transfer takes place, and (T$_2$−T$_1$) is the temperature difference across d. In electrochemical cells of typical tab designs, the tab to can contact typically occupies a small area. In cells of the disclosed embodiment, the conductive portion 118 to can contact area effectively occupies 100% of the cell diameter. Heat transfer through the base of the cell, and especially heat transfer from the negative electrode, are thereby improved in the disclosed embodiment due to the increased area over which the transfer takes place. The improved heat generation and transfer properties facilitate thermal management of the electrochemical cell. Management of a cell's operating temperature is typically an integral aspect in optimizing its performance and prolonging its service life.

Figure 3A:
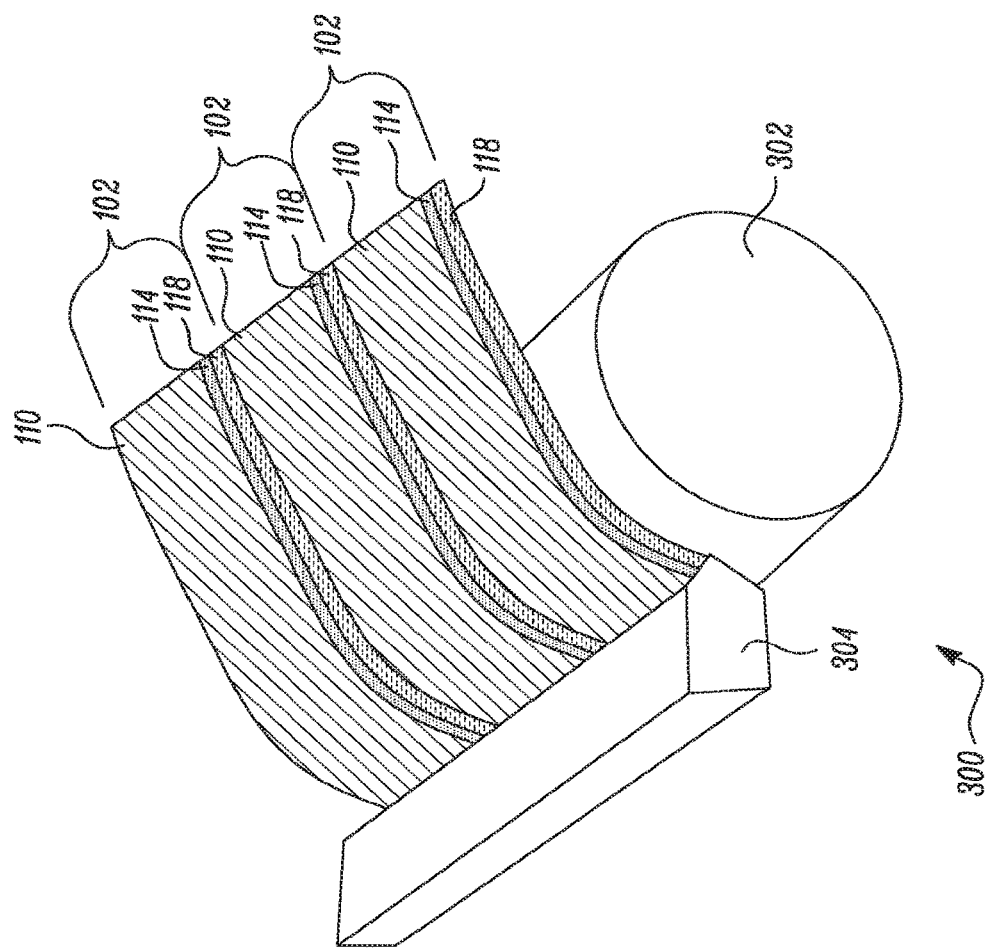
FIG. 3A illustrates an exemplary setup that can be used for coating a first substrate, according to certain embodiments of the present disclosure.
Figure 3B:
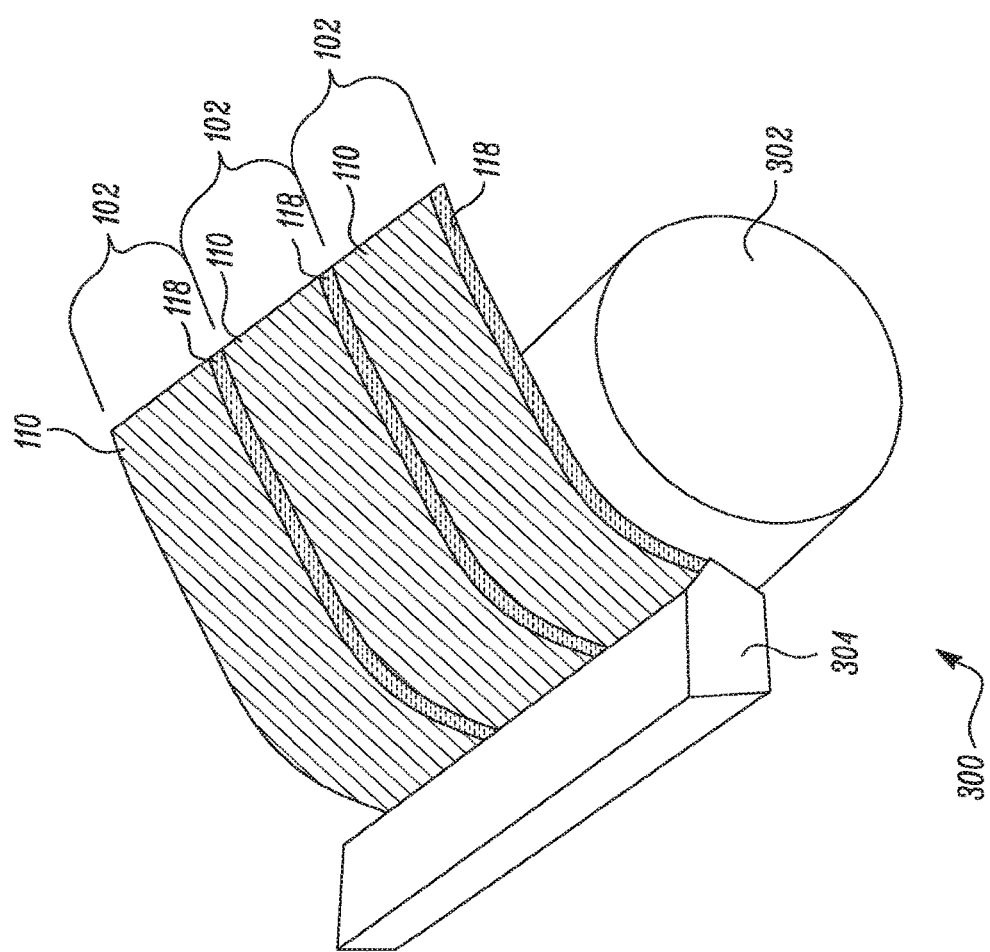
FIG. 3B illustrates an exemplary setup that can be used for coating a first substrate, according to certain embodiments of the present disclosure.

Referring to FIG. 3A, an exemplary setup 300 that can be used for coating of the first substrate 102 is depicted. In certain embodiments, when producing the first substrate 102, it is possible to produce multiple first substrates 102 by stacking individual first substrates 102 in tandem, alongside or, on top of one another. A portion of each first substrate 102 is coated with the first coating 110. Additionally, or optionally, the electrically insulative material 114 is coated alongside the first coating 110 i.e., onto the first portion 112 of each first substrate 102 and the conductive portion 118 is coated alongside the first portion 112 of each first substrate 102 i.e., onto corresponding second portions 116 of each first substrate 102. In some embodiments, insulating material 214 may be omitted as shown in FIG. 3B. When producing the first substrates 102, this stacking of multiple first substrates 102, alongside or on top of one another, may help manufacturers save time and offset costs that would otherwise be incurred if individual sections of laminates were used to form each first substrate 102 and coat the first portion 112 and the second portion 116 of such individual laminates with the electrically insulative material 114 and a conductive material for forming the conductive portion 118 respectively.

In the view of FIG. 3A, three first substrates 102 are shown rolled, in tandem, alongside one another through the exemplary setup 300. The setup 300 depicted includes a roller 302 and a coating tool 304 that can co-operate with a timing mechanism (not shown) to coat the first substrates 102 at pre-determined locations to obtain the desired portions and lengths of the first substrates 102. The three first substrates 102 may be disassociated from one another, for example, using a crimped margin (not shown) between adjacent first substrates 102, or automated using another shearing process performed prior to the multiple first substrates 102 entering the exemplary setup 300 of FIG. 3A, or after emanating as jointed multiple first substrates 102 of the desired length from the exemplary setup 300 of FIG. 3A. In some embodiments, the shearing may occur when the coating occurs using a shearing tool. In some embodiments, prior to shearing the coated substrate is baked prior to shearing with a shearing tool.

Figure 4:
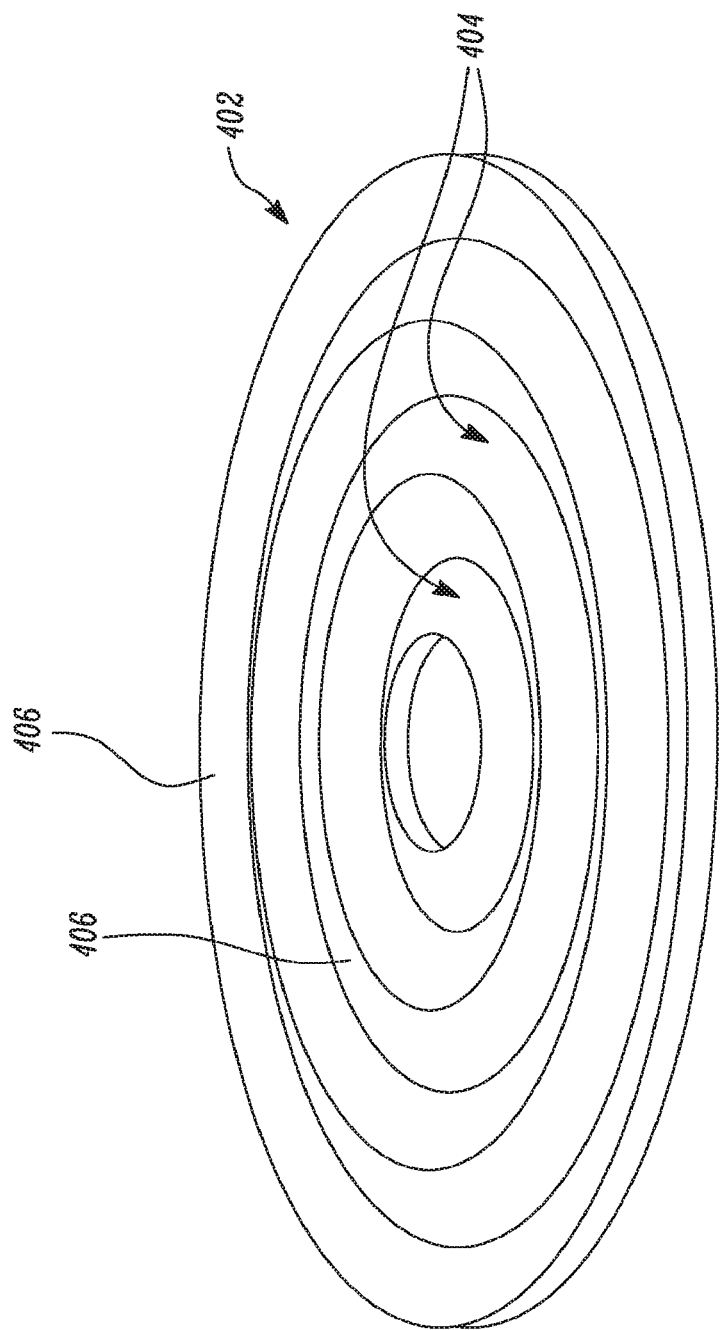
FIG. 4 illustrates a first cap having a contact surface that can be used to electrically connect with a conductive portion of a first substrate, according to certain embodiments of the present disclosure.

In certain embodiments, as shown in FIG. 4, a first cap 402 having a contact surface 404 is depicted. In certain embodiments, the first cap 402 is made from nickel. In other embodiments, the first cap 402 is made from a Ni-based alloy. The contact surface 404 of the first cap 402 is structured to correspond and connect with the conductive portion 118 of the rolled first substrate 102. In some embodiments, insulating material is placed on the opposite side of the can to create a compressive force to ensure the conductive portion 118 forms a good electrical contact with first cap 402. The insulating material may be placed on the top of the can or near the positive terminal to create the compressive force. In other embodiments, the anode swells with electrolyte and compresses the jelly roll against the can, which helps ensure that the conductive portion 118 forms a good electrical conduct with first cap 402. In some embodiments, the conductive portion 118 is welded to first cap 402. In some embodiments, welding is performed by laser welding and/or ultrasonic welding. In certain embodiments, as shown in the view of FIG. 4, the contact surface 404 is contoured in the shape of concentric grooves 406. Each of these grooves 406 may have a size in the range of 0.01 to 0.1 millimeter (mm) to correspond with a thickness of the first substrate 102 as these grooves 406 connect with the conductive portion 118 of the rolled first substrate 102.

Figure 5:
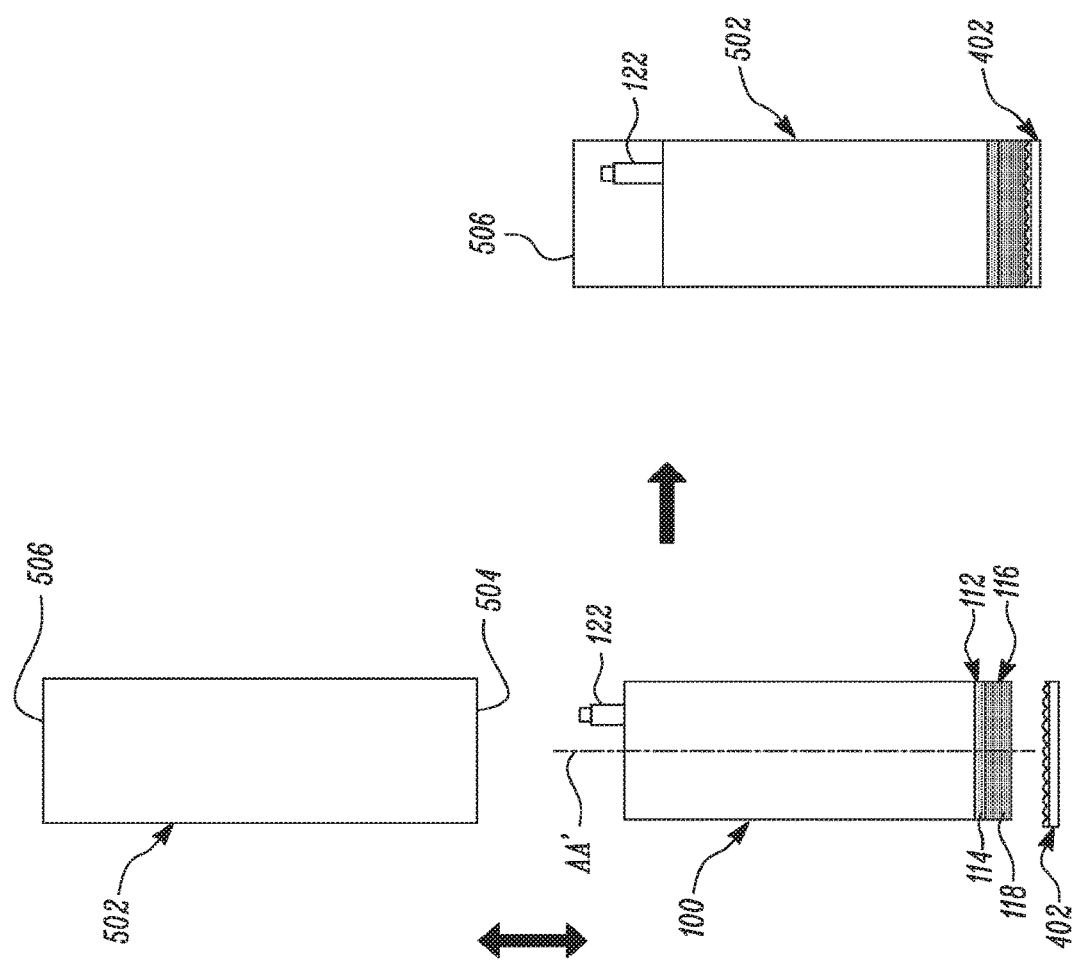
FIG. 5 illustrates a can that is shown to enclose a first substrate, an inner separator, a second substrate, and an outer separator of a cell with a first cap, according to certain embodiments of the present disclosure.

Referring to FIG. 5, a can 502 that can be used to enclose the first substrate 102, the inner separator 104, the second substrate 106, and the outer separator 108 of the cell 100 with the help of the first cap 402 is shown. In some embodiments, can 502 does not contain outer separator 108 and conductive portion 118 may connect directly to the can. In an embodiment, the can 502 has a first end 504 and a second end 506. In some embodiments, each of the first and second ends 504, 506 are open ends. In some embodiments, the first end 504 of the can 502 is adapted to receive the first cap 402 while the second end 506 of the can 502 is adapted to receive a second cap (not shown) that connects with the conductive tab 122 of the second substrate 106. In some embodiments, at least one of the first end and second end is closed, wherein the can 502 comprises a bottom and/or a top wall.

Figure 6A:
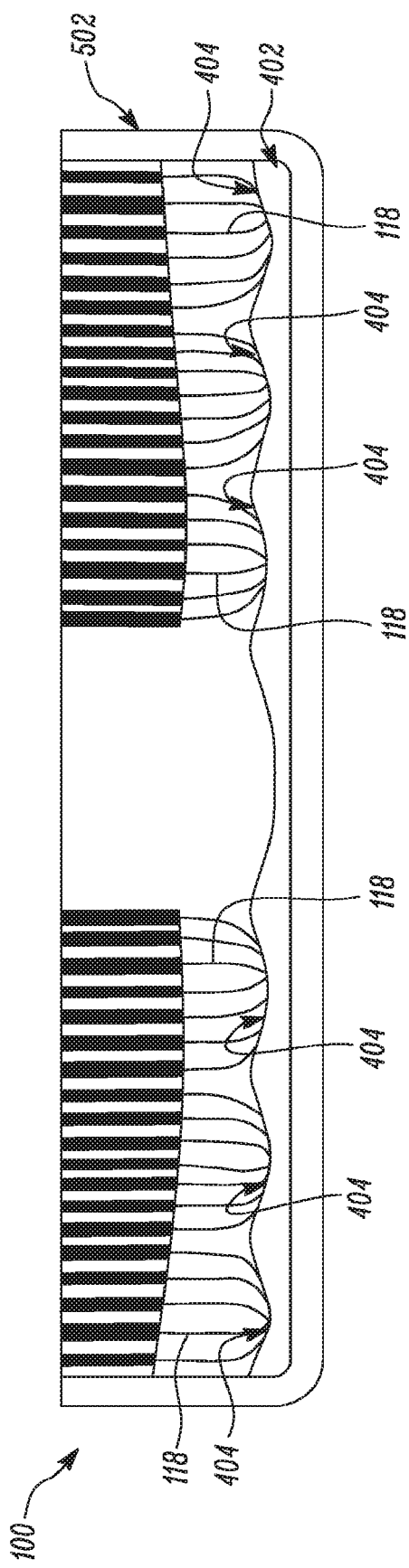
FIG. 6A illustrates a cross-sectional view of a bottom portion of an energy storage device showing contact surfaces of a first cap connected to a conductive portion of a first substrate, according to certain embodiments of the present disclosure.
Figure 6B:
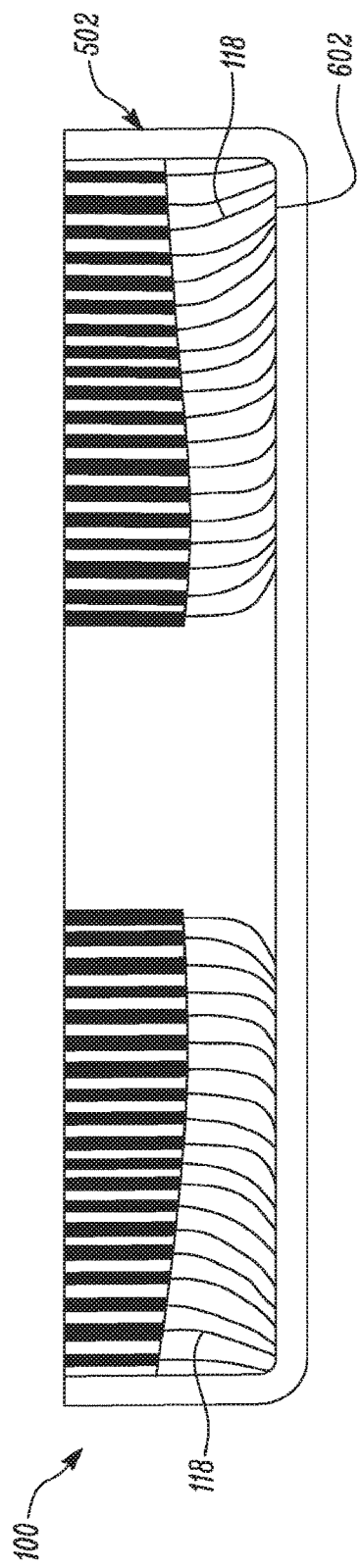
FIG. 6B illustrates a cross-sectional view of a bottom portion of an energy storage device showing contact surfaces of a can connected to a conductive portion of a first substrate, according to certain embodiments of the present disclosure.
Figure 6C:
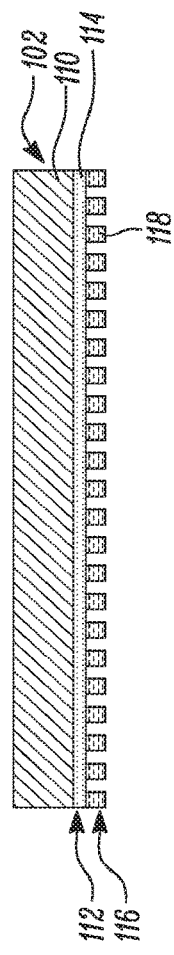
FIG. 6C illustrates a layout of a first substrate showing multiple conductive portions evenly and intermittently spaced from one another according to certain embodiments of the present disclosure.
Figure 6D:
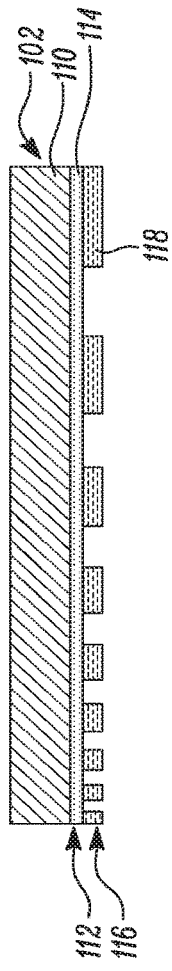
FIG. 6D illustrates a layout of a first substrate showing multiple conductive portions with progressively increasing widths and progressively increasing distances from one another according to certain embodiments of the present disclosure.
Figure 6E:
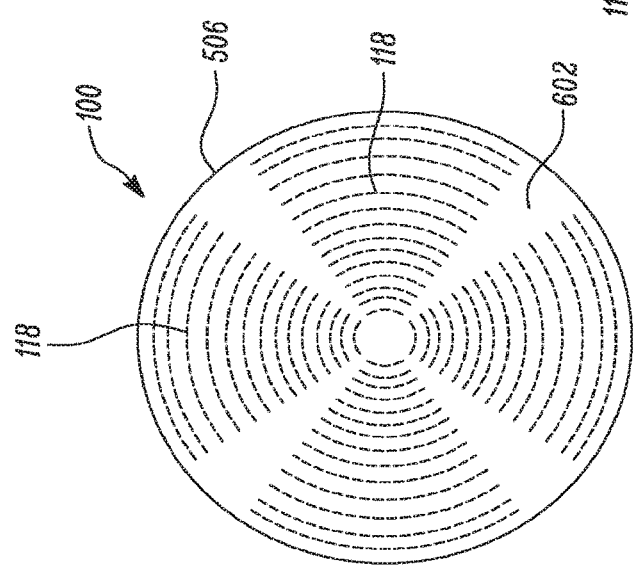
FIG. 6E illustrates a bottom view of a cell showing conductive portions of a rolled first substrate according to certain embodiments of the present disclosure.
Figure 7:
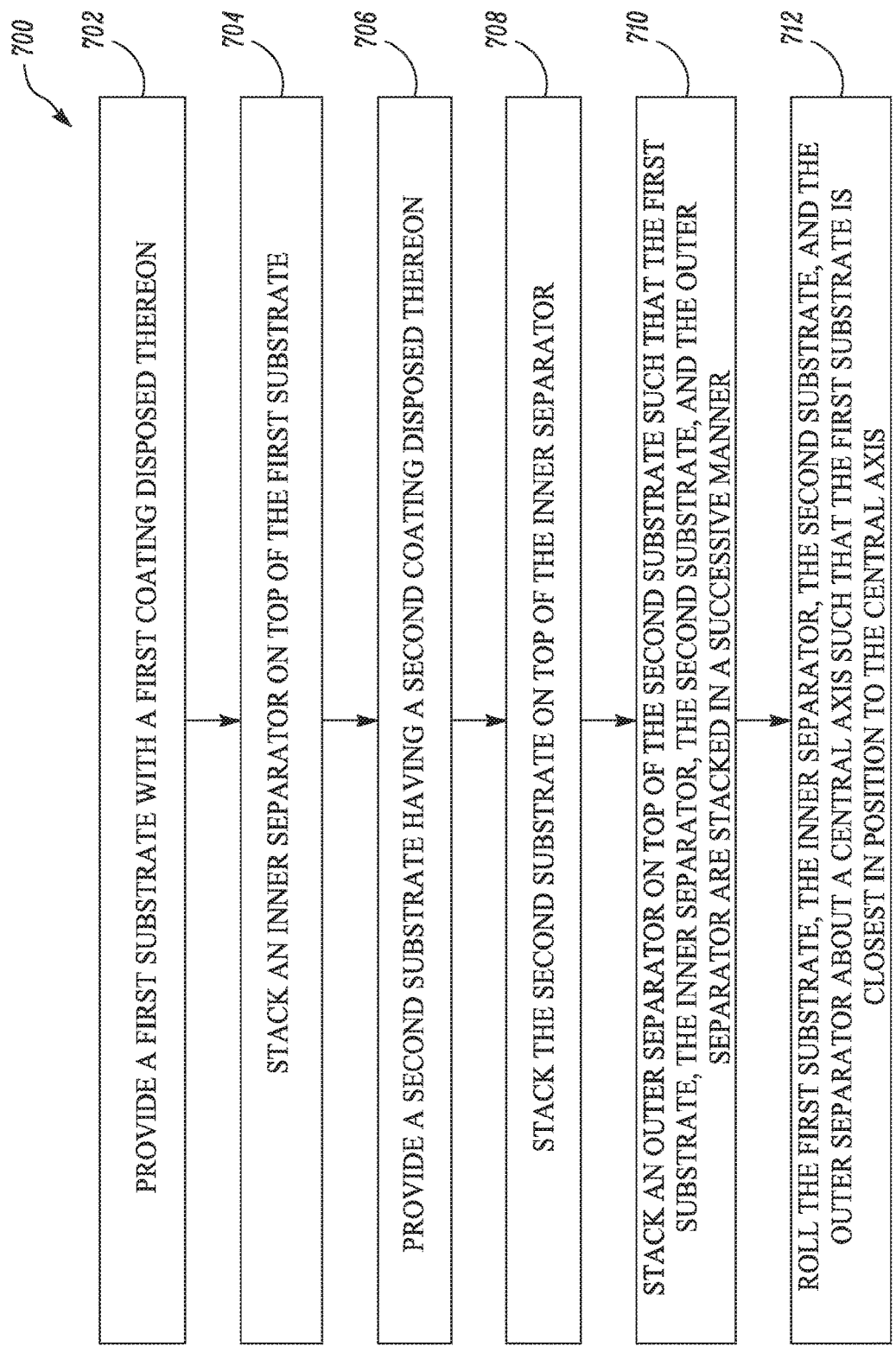
FIG. 7 illustrates a method for manufacturing a cell according to certain embodiments of the present disclosure.

FIG. 6A depicts a cross-sectional illustration of the first end of a can 502 comprising a cell with conductive portions 118 in contact with contact surfaces 404 of the first cap 402, with the conductive portions 118 shown bending when pushed up in contact with the first cap 402. However, when the conductive portion 118 is formed on the bottom of the jelly roll, imperfections (such as conductive material folded over on top of itself) may exist and may make the connection between the conductive portion 118 and the first cap more difficult. In some embodiments, to create a more robust connection between the conductive portion 118 and the first cap, features may be created by removing some of the end of the conductive portion as shown in FIGS. 6B-6E. Although in the view of FIG. 6A, a bottom portion of the cell 100 is shown containing the first cap 402, in other embodiments, the first cap 402 is omitted and the conductive portions 118 of the rolled first substrate 102 are instead connected with one another and a bottom wall 602 of the cell 100 as shown in the cross-sectional illustration of the first end of a can comprising a cell of FIG. 6B. In some embodiments, the conductive portions 118 may be of a pre-specified width and spaced apart from one another by a pre-specified distance, for example, a fixed width and a fixed distance as shown in the cross-sectional cell view of FIG. 6C. In some embodiments, the conductive portion 118 may be of progressively increasing widths and progressively increasing distances as shown in the cross-sectional cell view of FIG. 6D, and therefore connect with the bottom wall 602 of the cell 100 when rolled in can 506 at fixed width and distances from each other as shown in the bottom cell view of FIG. 6E. FIG. 7 illustrates a method 700 for manufacturing the cell 100, according to certain embodiments of the present disclosure. As shown at step 702, the method 700 includes providing the first substrate 102 with the first coating 110 disposed thereon. At step 704, the method 700 further includes stacking the inner separator 104 on top of the first substrate 102. At step 706, the method 700 includes providing the second substrate 106 having the second coating 120 disposed thereon. At step 708, the method 700 further includes stacking the second substrate 106 on top of the inner separator 104. At step 710, the method 700 further includes stacking the outer separator 108 on top of the second substrate 106 such that the first substrate 102, the inner separator 104, the second substrate 106, and the outer separator 108 are stacked in a successive manner. In some embodiments, step 710 is omitted and the can does not contain outer separator 108. At step 712, the method 700 includes rolling the first substrate 102, the inner separator 104, the second substrate 106, and the outer separator 108 about the central axis (e.g. AA') such that the first substrate 102 is closest in position to the central axis (e.g. AA').

In certain embodiments, pursuant to the method 700 of FIG. 7, and as shown in the view of FIGS. 1 and 2, the first substrate 102 is used to form an anode 124 of the cell 100 while the second substrate 106 is used to form a cathode 126 of the cell 100.

Figure 8:
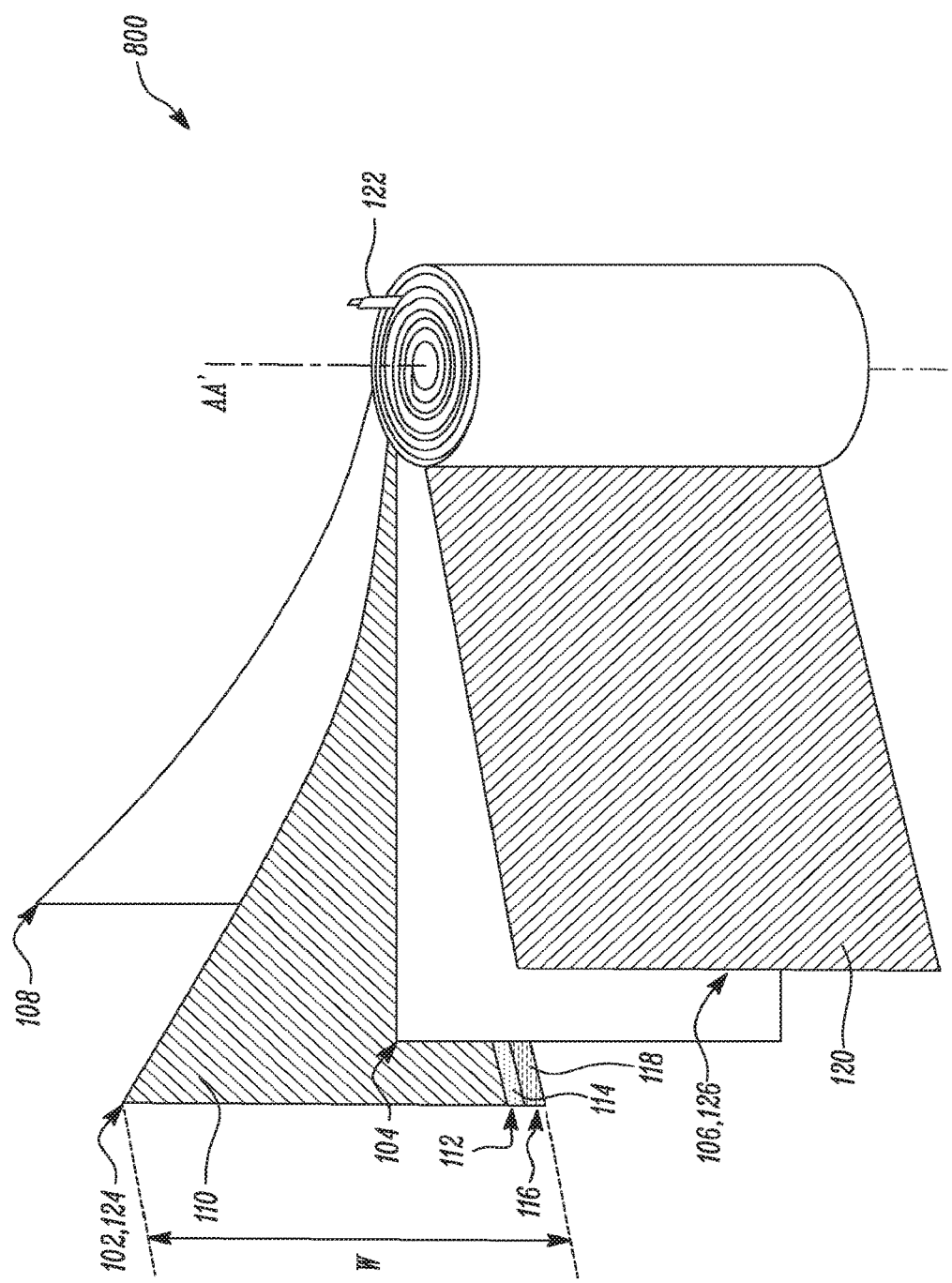
FIG. 8 illustrates a cell showing a first substrate, an inner separator, a second substrate, and an outer separator according to certain embodiments of the present disclosure.
Figure 9:
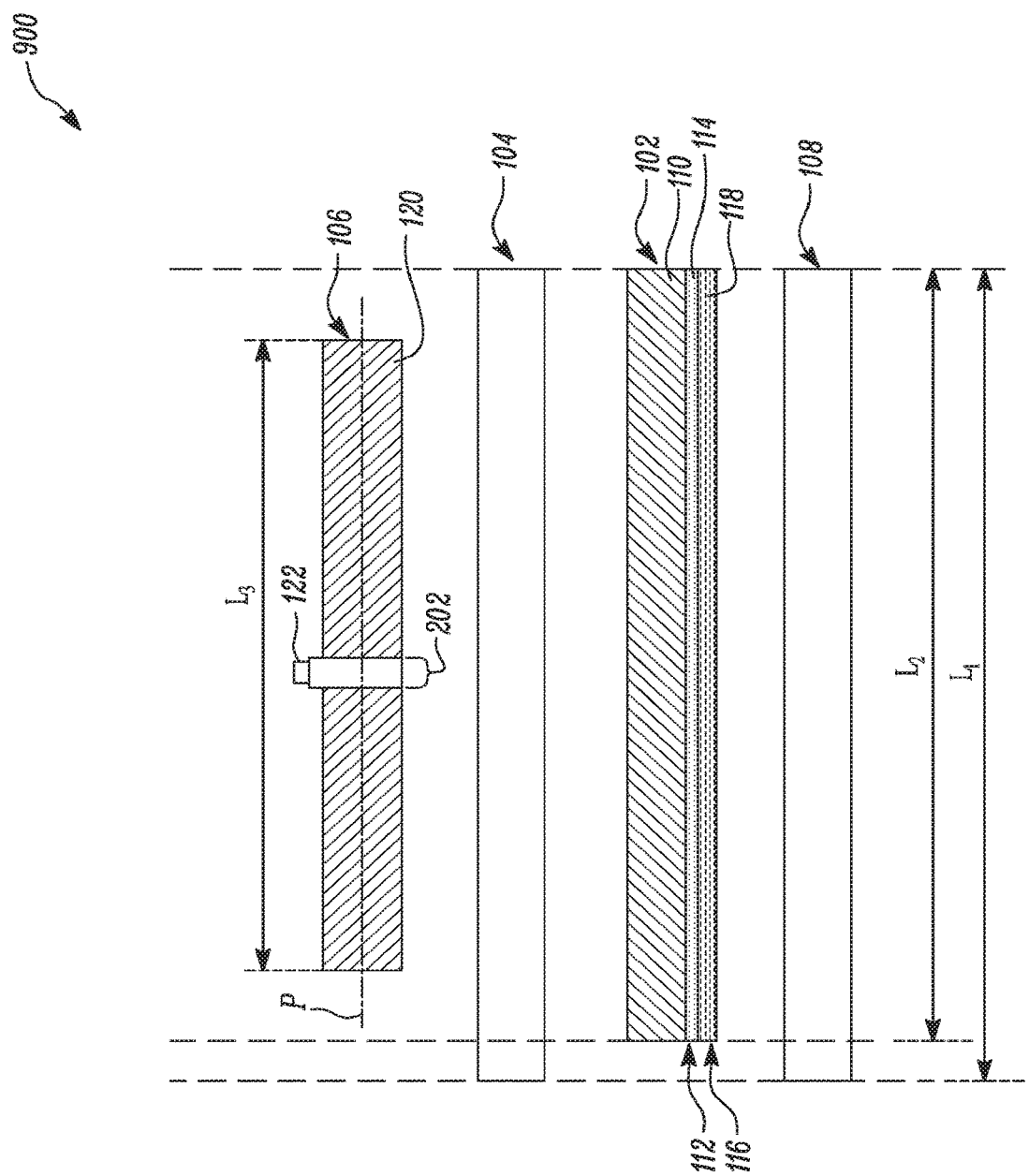
FIG. 9 illustrates a layout of the cell of FIG. 8 according to certain embodiments of the present disclosure.

However, as shown by way of FIGS. 8 and 9, a cell 700 according to embodiments of this disclosure has the anode 124 and the cathode 126 reversed i.e., interchanged in position such that the cathode 126 lies closest to the central axis AA'. Corresponding to such modifications, a contact surface of the first cap may vary to suitably correspond with the conductive portion 118 of the first substrate 102. Some examples of the alternative configurations of first caps 1002, 1004, 1006, and 1008 and their respective contact surfaces 1003, 1005, 1007, and 1009 are shown in the views of FIGS. 10A-10D. In some embodiments, the first cap is attached to an open end of the can. In some embodiments, the first cap, and its corresponding contact surfaces, is bottom or top wall of the can. In some embodiments, the cap topography may be formed by a stamping process. In some embodiments, a cantilever mechanism with spring (or similar mechanism) is underneath the disk of the cap to provide an upward force on the contact surfaces to provide better contact between the conductive portion 118 and the first cap.

Figure 10A:
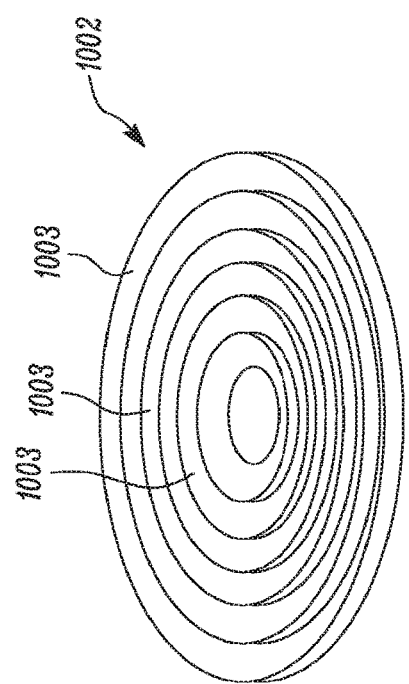
FIGS. 10A-10D each illustrate alternative configurations of a first cap having contact surfaces according to certain embodiments of the present disclosure.
Figure 10B:
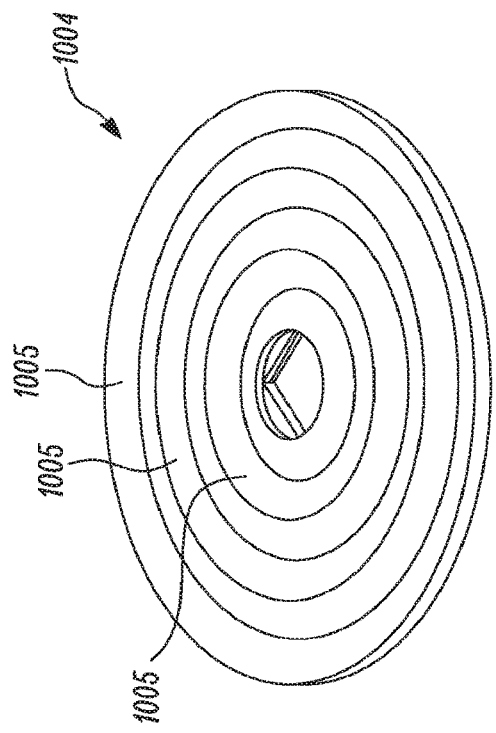
Figure 10C:
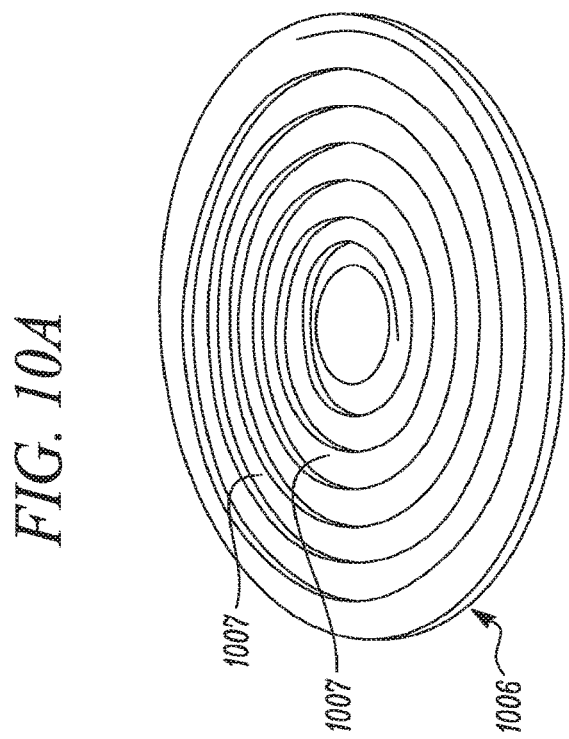
Figure 10D:
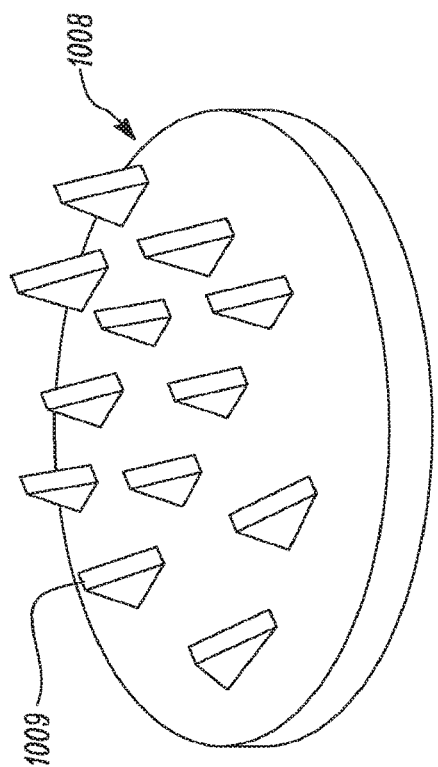
Figure 11A:
FIGS. 11A-11D each illustrate cross-sectional views of contact surfaces of a first cap according to certain embodiments of the present disclosure.
Figure 11B:
Figure 11C:
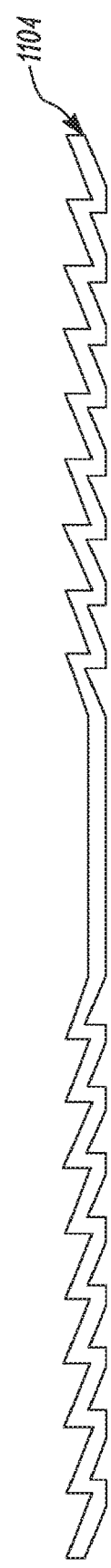
Figure 11D:

Further, in certain embodiments, the first cap, for example the first cap 1004 as shown in the view of FIG. 10B, has a cantilevered cross-section that further provides resilience to mechanical shocks and vibrations that may be encountered by the cell 100 in use. In some embodiments, a first cap as shown in 1002, 1004, 1006, and 1008 from FIGS. 10A-10D may be used. In other embodiments a contour may be defined by the contact surface as shown in the first caps 1100, 1102, 1104 and 1106 in the cross-sectional view of the first caps shown in FIGS. 11A-11D. These first caps illustrate contact surfaces in the shape of posts, pyramids, spikes and other suitable shapes to connect to the conductive portions 118 of the rolled first substrate 102.

The foregoing disclosure is not intended to limit the present disclosure to the precise forms or embodiments disclosed herein. As such, it is contemplated that various alternative forms, embodiments and/or modifications to the present disclosure, whether explicitly described or implied herein, are possible in light of the disclosure. Having thus described embodiments of the present disclosure, a person of ordinary skill in the art will recognize that changes may be made in form and detail without departing from the scope of the present disclosure.

In the foregoing specification, the disclosure has been described with reference to specific embodiments. However, as one skilled in the art will appreciate, various embodiments disclosed herein can be modified or otherwise implemented in various other ways without departing from the spirit and scope of the disclosure. Accordingly, this description is to be considered as illustrative and is for the purpose of teaching those skilled in the art the manner of making and using various embodiments of the disclosed battery system. It is to be understood that the forms of disclosure herein shown and described are to be taken as representative embodiments. Equivalent elements, or materials may be substituted for those representatively illustrated and described herein. Moreover, certain features of the disclosure may be utilized independently of the use of other features, all of which is apparent to one skilled in the art after having the benefit of this description of the disclosure. Expressions such as "including", "comprising", "incorporating", "consisting of", "have", "is" used to describe and claim the present disclosure are intended to be construed in a non-exclusive manner, namely allowing for items, components or elements not explicitly described also to be present. Reference to the singular is also to be construed to relate to the plural.

Further, various embodiments disclosed herein are to be taken in the illustrative and explanatory sense and should in no way be construed as limiting of the present disclosure. All joinder references (e.g., connected, associated, coupled, and the like) are only used to aid the reader's understanding of the present disclosure, and may not create limitations, particularly as to the position, orientation, or use of the elements disclosed herein. Therefore, joinder references, if any, are to be construed broadly. Moreover, such joinder references may not necessarily infer that two elements are directly connected to each other.

Additionally, all numerical terms, such as, but not limited to, "first", "second", "one", "another", or any other ordinary and/or numerical terms, should also be taken only as identifiers, to assist the reader's understanding of the various elements, embodiments, variations and/or modifications of the present disclosure, and may not create any limitations, particularly as to the order, or preference, of any element, embodiment, variation and/or modification relative to, or over, another element, embodiment, variation and/or modification.

It will also be appreciated that one or more of the elements depicted in the drawings/figures can also be implemented in a more separated or integrated manner, or even removed in certain cases, as is useful in accordance with a particular application.

What is claimed is:

1. An energy storage device, comprising:
a cell comprising:
a first substrate having a proximal end and a distal end, wherein the first substrate comprises a first portion and a second portion, the second portion comprises a conductive material located at the proximal end, the conductive material comprises a plurality of conductive portions, each of the conductive portions comprise a width, and each of the conductive portions are spaced apart from one another by a non-conductive portion;
a second substrate; and
an inner separator disposed between the first substrate and the second substrate;
wherein the first substrate, the inner separator, and the second substrate are rolled about a central axis to form the cell; and
a can comprising a first end and a second end, wherein the first end comprises a first cap comprising a contact surface;
wherein each of the spaced apart conductive portions are substantially in contact with the first cap and are bent; and
wherein the plurality of conductive portions of the first substrate form a concentric circular pattern that is in contact with the first cap.

2. The device of claim 1, wherein the conductive material consists essentially of the first substrate.

3. The device of claim 1, wherein the first substrate is a current collector.

4. The device of claim 1, wherein the first substrate is positioned closest to the central axis when rolled.

5. The device of claim 1, wherein the second substrate is positioned closest to the central axis when rolled.

6. The device of claim 1, wherein the first portion is located between a first coating and the second portion, and is coated with an electrically insulative material.

7. The device of claim 6, wherein the second portion is located adjacent to the first portion.

8. The device of claim 1, wherein the second substrate further comprises a conductive tab.

9. The device of claim 8, wherein the conductive tab is disposed partway along a length of the second substrate and extends transverse to a mid-plane of the second substrate.

10. The device of claim 1, wherein the first substrate forms one of an anode and a cathode and the second substrate forms another of the anode and the cathode.

11. The device of claim 1, wherein the conductive material is in electrical contact with the contact surface.

12. The device of claim 1, wherein the first end comprises a bottom wall.

13. The device of claim 1, wherein each of the first and second ends are open ends.

14. The device of claim 13, wherein the first end of the can is configured to receive the first cap.

15. The device of claim 13, wherein the second end of the can is configured to receive a second cap.

16. The device of claim 1, wherein the first cap comprises at least one of nickel (Ni) and a Ni-based alloy.

17. The device of claim 1, wherein the contact surface of the first cap comprises a weld in electrical communication with the second portion.

18. The device of claim 1, wherein each of the conductive portions comprise substantially the same width.

19. The device of claim 1, wherein each of the conductive portions are spaced apart by substantially the same distance.

20. The device of claim 1, wherein each of the conductive portions comprise progressively increasing widths.

21. The device of claim 1, wherein each of the conductive portions are spaced apart by progressively increasing distances.

22. The device of claim 1, wherein the plurality of conductive portions of the first substrate substantially fills the entirety of a full diameter of the first end.

23. A method for forming the cell of claim 1, the method comprising:
    providing the first substrate;
    disposing the inner separator over the first substrate;
    disposing the second substrate over the inner separator; and
    rolling the first substrate, the inner separator, and the second substrate disposed over each other about a central axis to form the cell.

24. The method of claim 23, wherein the first substrate is closest in position to the central axis.

25. The method of claim 23, wherein the second substrate is closest in position to the central axis.

26. The method of claim 23, wherein the first substrate, the inner separator, and the second substrate are disposed over each other in a successive manner.

27. The method of claim 23, further comprising coating the first portion with an electrically insulative material.

28. The method of claim 27, wherein the second portion is located adjacent to the first portion.

29. The method of claim 23, further comprising forming a conductive tab partway along a length of the second substrate by extending a portion of the second substrate transverse to a mid-plane of the second substrate.

30. A method of forming an energy storage device comprising:
    the method of claim 23; and
    placing the cell into a can comprising a first end and a second end.

31. The method of claim 30, further comprising electrically connecting the conductive material with the contact surface.

* * * * *